Oct. 20, 1931.  F. J. HARDMAN  1,828,410
WINDSHIELD CLEANER
Filed March 23, 1929   2 Sheets-Sheet 1
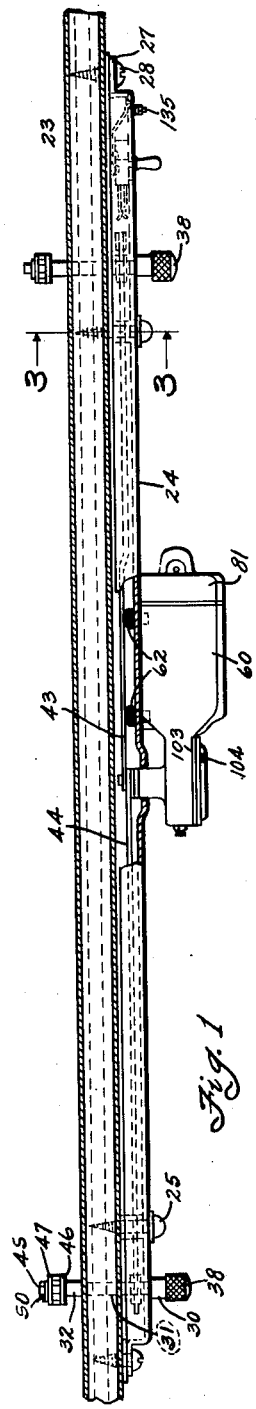
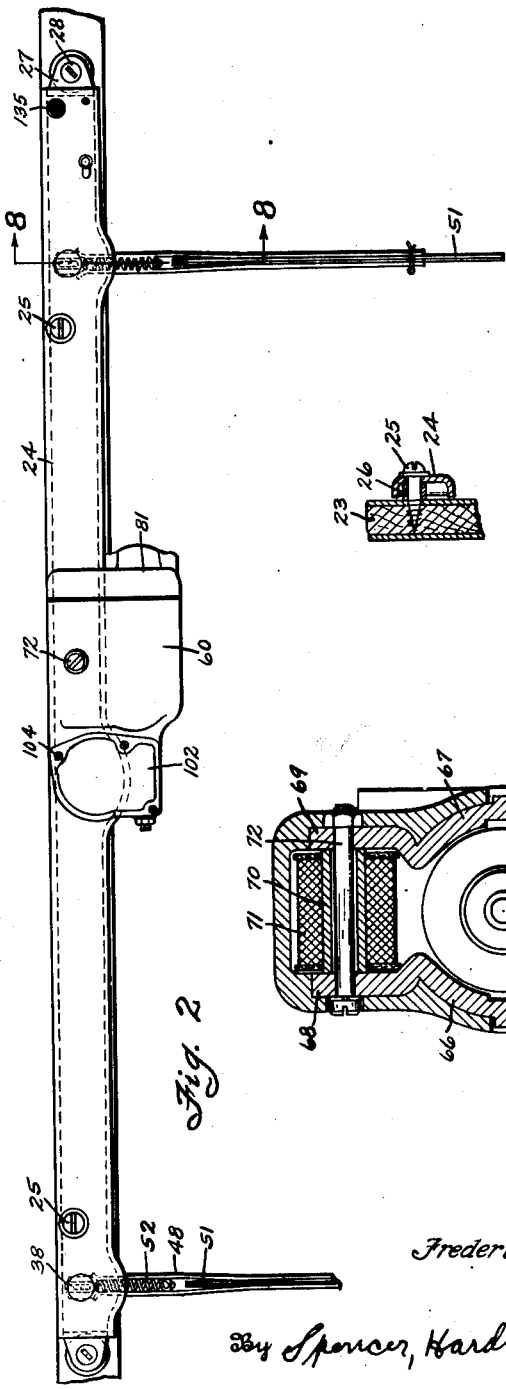
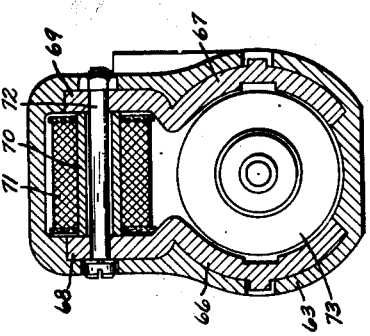
Inventor
Frederick J. Hardman
By Spencer, Hardman & Fehr
His Attorneys Oct. 20, 1931.  F. J. HARDMAN  1,828,410
WINDSHIELD CLEANER
Filed March 23, 1929  2 Sheets-Sheet 2
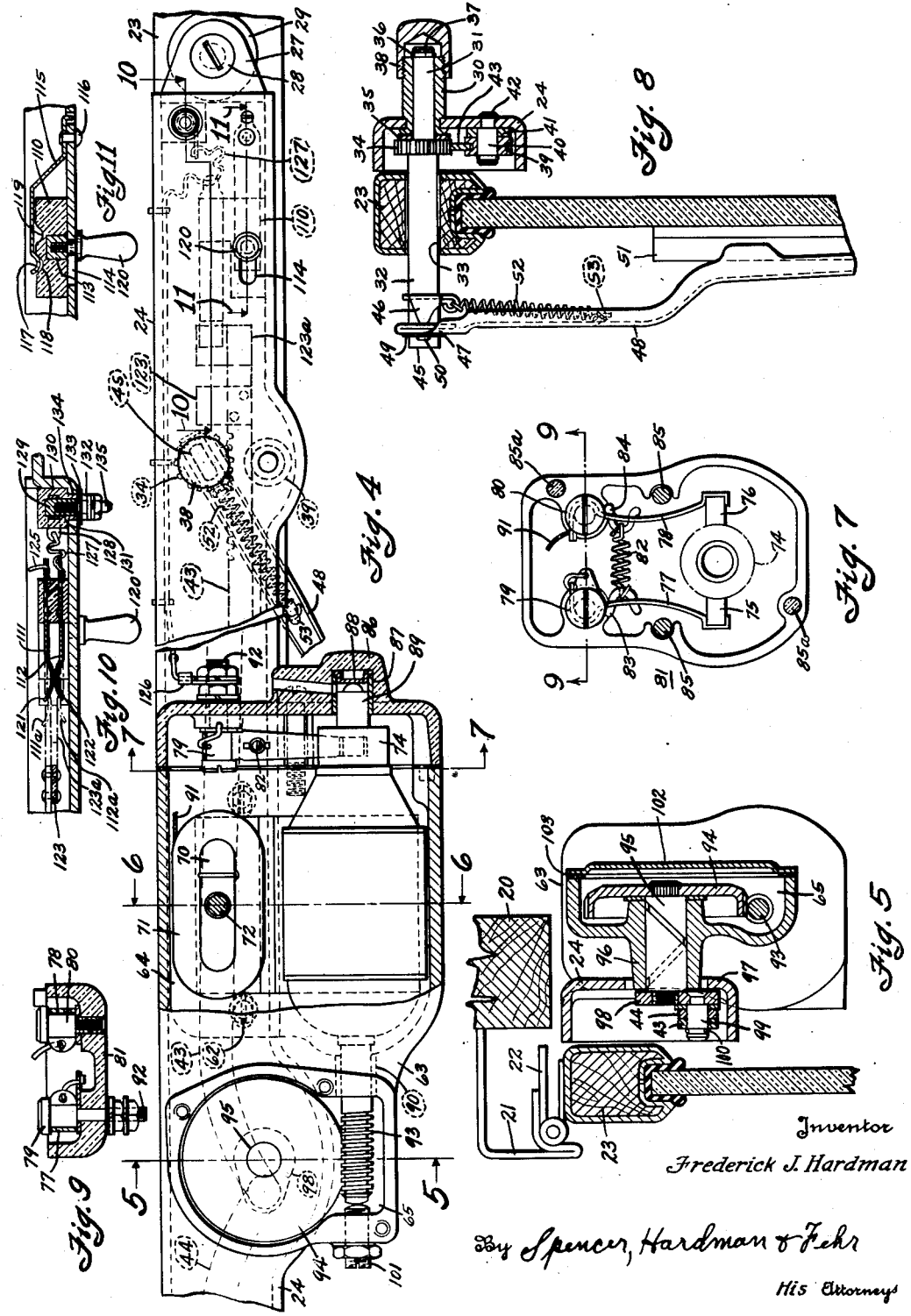
Inventor
Frederick J. Hardman
By Spencer, Hardman & Fehr
His Attorneys Patented Oct. 20, 1931

1,828,410

UNITED STATES PATENT OFFICE

FREDERICK J. HARDMAN, OF DAYTON, OHIO, ASSIGNOR TO DELCO-REMY CORPORATION, OF ANDERSON, INDIANA, A CORPORATION OF DELAWARE

WINDSHIELD CLEANER

Application filed March 23, 1929. Serial No. 349,437.

This invention relates to improvements in windshield cleaners, and is particularly directed to an electrically operated cleaner, and it is an object thereof to provide a circuit interrupter in conjunctive relation with definitely operating parts of the device so that the operation of the driving motor may be controlled to cause the wiper mechanism to stop at the end of a stroke.

It is a further object of this invention to assure the stopping of the wiping mechanism at a predetermined point in the cycle of wiper movement.

Further objects and advantages of the present invention will be apparent from the following description, reference being had to the accompanying drawings wherein a preferred embodiment of one form of the present invention is clearly shown.

In the drawings:

Fig. 1 is a plan view of a windshield cleaner involving my invention, certain parts of the structure being broken away and shown in section for the sake of clearness in illustration.

Fig. 2 is an elevational view of the same as appears from a position within the body of the vehicle.

Fig. 3 is a sectional view on the line and in the direction of the arrows 3—3 of Fig. 1, showing a method of mounting and spacing the cleaning mechanism upon the rail of the windshield.

Fig. 4 is an enlarged detail view of the driving unit, with certain parts thereof shown in section.

Fig. 5 is a sectional view through the motion translating mechanism and windshield, as viewed along the line and in the direction of the arrows 5—5 of Fig. 4.

Fig. 6 is a sectional view through the driving unit substantially as indicated along the line and in the direction of the arrows 6—6 of Fig. 4.

Fig. 7 is a view in elevation of the motor cover and brush assembly of the driving unit, and represents a view taken along the line and in the direction of the arrows 7—7 of Fig. 4.

Fig. 8 is a view in section through the cleaning mechanism showing the support of the wiper shaft, substantially as indicated by the line and arrows 8—8 of Fig. 2.

Fig. 9 is a sectional view through the motor cover, illustrating the means of mounting the commutator brushes, and is taken along the line and in the direction of the arrows 9—9 of Fig. 7.

Fig. 10 is a longitudinal sectional view through the contact device, or circuit controller as appears along the line and in the direction of the arrows 10—10 of Fig. 4.

Fig. 11 is a similar view of the contact device illustrating the detent mechanism, as appears along the line and in the direction of the arrows 11—11 of Fig. 4.

With particular reference to the drawings 20 indicates a part of the vehicle cab structure, or a forward portion of the body enclosure, which forms one of the bounding rails for the windshield opening, and has attached thereto in any preferred manner, a channel or bracket member 21 to which are fixed hinge members 22 supporting a windshield rail 23 carrying the glass of the windshield. Upon the rail 23 there is mounted a channel member 24 which provides a support for the wiper mechanism and driving motor, and forms a housing for the motion translating mechanism connecting the driving motor with the wiper mechanism.

The channel member 24 is of elongated formation as generally exhibited in Figs. 1, 2, 3 and 4, and is held in spaced relation to the windshield rail 23 by means of screws 25, and the spacers 26 inserted between the channel member 24 and the rail 23, substantially as indicated in Fig. 3. The extreme ends of the channel member are closed by means of an angular bracket 27 secured to the channel member, and apertured to receive a mounting screw 28 driven through a spacing washer 29 and into the rail 23.

Near each end of the channel member 24, there is provided a bearing sleeve 30 which rotatably supports a wiper shaft 31 having a driving extension 32 extending through a transverse aperture 33 in the windshield rail 23. The wiper shaft 31 is fixed to a pinion 34, and supports a bearing washer 35 within the channel member 24, and is retained within the bearing sleeve 30 by a spring ring 36 seated in an annular groove 37. The cap 38 threaded upon the end of the sleeve 30 provides a receptacle for lubricant for the shaft 31, and encloses the spring ring connection. Within the channel member and in substantially vertical alignment with the pinion 34, there is secured an idler or guide roller 39 by means of the shouldered pin 40 and the spacing washer 41 secured to the channel member as at 42.

The bearing sleeve 30 and the guide roller 39, are in sufficient spaced relation on the member 24, to provide for reception and guidance therebetween of a rack bar 43 or 44, which meshes with the pinion 34, and has operative connection with the driving motor, presently to be described. The driving end 32 of the wiper shaft 31 is provided with a non-rounded or flattened portion 45 which drivingly engages a spring clip 46, a driving shank 47 of a wiping arm 48, and a washer 49 secured thereto by means of the cotter pin 50. The wiping arm 48 pivotally supports a wiping blade 51 which is urged in contacting relation with the windshield glass by means of a spring 52 connected to a tongue 53 struck from the arm 48, and attached to the spring clip 46, as illustrated in Fig. 8.

The channel member 24, provides a support for a driving motor 60, which is supported intermediate of the wiper shafts 31 by mounting screws 62, as illustrated in Fig. 1. In the illustrated form, the driving motor 60 is embodied in a die cast member 63, providing a motor housing 64, and a compartment 65 for motion translating mechanism connecting the motor shaft with the rack bars 43 and 44, hereinbefore described.

The power device within the compartment 64, in the present instance, is an electric motor which requires magnetic field pieces. The housing 63 being of die cast formation is of non-magnetic material so that the common practice of using the housing as a magnetic field must be dispensed with, and thus separate field pieces 66 and 67 are provided in the form of liners within the housing 63, the field pieces being cast in the housing at the time the housing is formulated. The field pieces 66 and 67 are provided with the paralleled extensions 68 and 69, which support a core 70 and field winding 71, by means of the bolt or screw 72. The opposite ends of the field pieces 66 and 67 are shaped to conform to the contour of the armature 73 of the electric power device.

The armature 73 has a commutator 74, engaged by brushes 75 and 76 carried by brush holders 77 and 78 respectively. These brush holders are pivotally supported upon studs 79 and 80 respectively, the studs being mounted within the end cover 81 which is formed of molded insulating material such as bakelite or the like. Brushes 75 and 76 are urged into engagement with the commutator 74, by a spring 82 interposed between the brush holders and secured thereto by the insulating loops 83 and 84 seated within a slot of each brush holder.

Insulating cover 81 fits over the open end of the housing 63 and provides a cover therefor, and also provides an insulating support for the brush holder studs 79 and 80. The cover is secured to the housing 63 by screws 85 which cooperate with the alignment studs 85a received in complementary recesses in the member 63, to maintain the motor bearings in correct relation. A lug 86 formed on the cover is recessed to receive a bearing sleeve 87 and a thrust cup 88, which provide a bearing for journalling one end of the armature shaft 89 of the armature 73, said armature shaft being journalled also in a bearing 90 carried by a partition separating the chambers 64 and 65 of the casting 63. The brush holder 78 is in electrical communication with the field winding 71 through the lead wire 91. The brush holder 77 is in communication with any suitable source of electrical energy adapted to be connected with the stud 79, which extends outside of the end cover 81 providing a terminal 92 for the brush holder.

The end of the armature shaft 89, extending into the chamber 65, is provided with a worm 93 meshing with a worm wheel 94 rotatably supported in the compartment 65, by a shaft 95 journalled in a bearing portion 96, formed in the back wall of the housing 63. The channel member 24 is provided with an apertured embossment 97 for receiving the end of the bearing 96. The motor 60 is so mounted upon the channel member 24, as to present the end of the shaft 95 within the embossment 97 exterior of the bearing 96, to which is attached a crank member 98 supporting a crank pin 99, to which are rotatably secured the rack bars 43 and 44 by means of the spring ring 100.

The compartment 65 housing the motion transmitting mechanism, is provided with an adjustable thrust bearing 101 for properly adjusting the motor within its bearing, and this chamber after being packed with grease or other lubricant is provided with the transmission cover 102 and gasket 103, which are secured in place by the cap screws 104.

Within this structure, means are provided which cooperate with the moving parts of the transmission mechanism for controlling the operation of the wiper mechanism and the starting and stopping of the power device therefor, to the extent of causing the driving motor to stop under such conditions that the wiper mechanism will always be at or near the end of a stroke when it comes to rest. This is accomplished by mounting at one end of the channel member 24, a contact device such as illustrated in Figs. 10 and 11. The contact device is movably supported so as to be optionally actuatable by the motion translating mechanism. This contact device takes the form of a block of nonconducting material110, moldably securing a pair of contact blades 111 and 112 and a threaded insert 113.

The contact carrier 110 is of L formation as indicated in the dotted line structure of Fig. 4, and is disposed within the channel member 24, so that one leg thereof lies in the angular juncture of the bridge and flange portions of the channel member, and so that the metallic isert 113 is positioned in coactive relation with an elongated aperture or slot 114, in the bridge portion of the channel member 24. A control knob 120 is inserted through the slot 114 and threaded into the insert 113 and cooperates with a detent spring 115 fixed to the channel member 24 to retain the contact carrier in proper position. The detent spring 115 is secured at one end to the member 24 by means of a rivet or equivalent device 116, and is provided at the free end with a deformation 117, which is resiliently received by notches 118 and 119 in the face of the block 110, depending upon the position of the block and control knob 120, with respect to the slot 114.

The contact blades 111 and 112 are secured in the block 110, in separated relation, but their free ends are sprung inwardly at 121 and 122 to form normally engaging but separable contact points. It will be noticed from the illustration in Figs. 4 and 10 that the contact device is positioned within the channeled member 24 in substantial longitudinal alignment with the rack bar 43, and in such close proximity therewith that the device may be shifted to one extreme or the other of the slot 114, by which the cooperative relation between the contact device and the rack bar is varied. Movement of the contact device to the left hand extreme of the slot will bring the contact device and the rack bar into closer relation than when the contact device is moved to the right hand extreme of the slot 114.

The shifting provision of the contact carrier, is adapted to control the energization and deenergization of the circuit through the driving motor as follows. To a part of the motion translating mechanism, in the present instance the rack bar 43, there is attached a nonconducting blade or piece of insulation 123, which is adapted to engage the contact blades 111 and 112 when the contact device is shifted to the near position so as to separate them to open the electrical circuit therethrough, but to be free of engagement therewith when the contact device is shifted to the far position.

The contact blade 111 is provided with a lead 125 which is attached to a clip 126, having connection with the binding post 92 leading to the brush holder 77. The contact blade 112 is provided with a pigtail 127 attached to a clip 128 secured to an insert 129, which is moldably secured within a nonconducting block 130 supported by the channel member 24. The block 130 with its insert 129 threadedly receives a stud 131, and is secured to the member 24 by means of the nut 132 and insulating washer 133 in cooperation with a turret 134 of the block 130, received by an aperture in the end of the member 24. The stud 131 exterior of the member 24 is provided with a second nut and washer to form a binding post 135, to which a source of energy may be connected.

From the above description it is seen that an optionally separable electrical connection is made between the binding posts 92 and 135 by means of the clip 126, the lead 125, contact springs 111 and 112, pigtail 127, clip 128 and insert 129. The slot 114 and the manual control 120 provide means for changing the relative juxtaposition of the contact device with the motion translating mechanism, in that by moving the knob 120 to the extreme left end of the stop 114, the contact blades 111 and 112 will be carried an equal distance or to that position indicated in 111' and 112' in Fig. 10. The deformation 117 of the detent spring 115 will then be seated within the notch 119 which will retain the contact carrier in the adjusted position.

This brings the contact device and the motion translating mechanism into such relative positions, that operation of the mechanism will cause an engagement of a part thereof with the contact device, so that the normally engaging points 121 and 122 will be separated. In the structure illustrated the rack bar 43 will be reciprocated from the dotted line position of 123 to the position 123a, as indicated in Figs. 4 and 10. When this motion occurs, with the contact device shifted to the position just stated, it is obvious from Fig. 10 that the member 123 will then engage and separate the contact blades 111 and 112, and open the circuit therethrough.

This operation will be accomplished only when the rack bar 43 is near one end of its reciprocatory strokes, and thus near the end of the stroke of the wiper arm, the motor circuit always being opened at substantially the same point in the cycle of wiping movement. Due to the present association of elements, this point in the cessation of operation occurs at the end of the stroke when the wiper blade 51 is toward the right hand extreme of its range of movement.

When it is desired to start the cleaning mechanism in its cycle of operation, the control member 120 is moved to the other extreme of the slot 114 or to the full line position as indicated in Figs. 4, 10 and 11. The detent 115 is then disposed with its deformation 117 within the notch 118 of the block 110, and the contact blades 111 and 112 are withdrawn from over the actuating member 123, so that the motor circuit is again closed which causes the apparatus to perform its cleaning function, until stopped by a subsequent movement of the contact device into the stop position.

While the form of embodiment of the present invention as herein disclosed, constitutes a preferred form, it is to be understood that other forms might be adopted, all coming within the scope of the claims which follow.

What is claimed is as follows:

1. In a windshield cleaner, the combination comprising, a wiper mechanism, an electric driving motor therefor, motion translating mechanism connecting the motor with the wiper mechanism, a support for the wiper mechanism, the driving motor and the translating mechanism, a contact device movably carried by said support, and optionally engageable with and separable from the translating mechanism for controlling the operation of the driving motor.

2. In a windshield cleaner, the combination comprising, a wiper mechanism, an electric driving motor therefor, motion translating mechanism connecting the motor with the wiper mechanism, a support for the wiper mechanism, the driving motor and the translating mechanism, a contact device reciprocably carried by the support and providing a pair of normally engaging contact springs, the contact device being located adjacent the translating mechanism and actuated thereby for opening and closing the circuit through said driving motor.

3. In a windshield cleaner, the combination comprising, a wiper mechanism, an electric driving motor therefor, motion translating mechanism connecting the motor with the wiper mechanism, a support for the wiper mechanism, the driving motor and the translating mechanism, a contact device reciprocably carried by the support and providing a pair of normally engaging contact springs, the contact device being located adjacent the translating mechanism and actuated thereby for opening and closing the circuit through said driving motor to stop the driving motor only at the end of the stroke of the wiper mechanism.

4. In a windshield cleaner, the combination comprising, a wiper mechanism, an electric driving motor therefor, motion translating mechanism connecting the motor with the wiper mechanism, a support for the wiper mechanism, the driving motor and the translating mechanism, a contact device reciprocably carried by the support and providing a pair of normally engaging contact springs, the contact device being located adjacent the translating mechanism and actuated thereby for opening and closing the circuit through said driving motor, said contact device adapted to stop the driving motor always at the same point in its cycle of movement of the wiper mechanism.

5. In a windshield cleaner, the combination comprising, a wiper mechanism, an electric driving motor therefor, motion translating mechanism connecting the motor with the wiper mechanism, a support for the wiper mechanism, the driving motor and the translating mechanism, a contact device reciprocably carried by the support and providing a pair of normally engaging contact springs, the contact device being positioned adjacent the translating mechanism and actuated thereby for opening and closing the circuit through said driving motor, said contact device being movable into engaging relation with the translating mechanism for stopping the driving motor and movable out of engaging relation therewith for starting the driving motor.

6. In a windshield cleaner, the combination comprising, a wiper mechanism, an electric driving motor therefor, motion translating mechanism connecting the motor with the wiper mechanism, a support for the wiper mechanism, the driving motor and the translating mechanism, a contact device reciprocably carried by the support and providing a pair of normally engaging contact springs, the contact device being positioned adjacent the translating mechanism and actuated thereby for opening and closing the circuit through said driving motor, said contact device comprising, a pair of contact springs secured within a block of insulating material, and disposed on said support for engagement with a nonconducting member carried by said motion translating mechanism.

7. In a windshield cleaner, the combination comprising, a wiper mechanism, an electric driving motor therefor, motion translating mechanism connecting the motor with the wiper mechanism, a support for the wiper mechanism, the driving motor and the translating mechanism, a contact device reciprocably carried by the support and providing a pair of normally engaging contact springs, the contact device being positioned adjacent the translating mechanism and actuated thereby for opening and closing the circuit through said driving motor, said contact device comprising, a pair of contact springs secured within a block of insulating material, and disposed on said support for engagement with a nonconducting member carried by said motion translating mechanism, said nonconducting member operating to separate the contacts, and thereby interrupting the circuit through the motor when the contact device is shifted into engaging relation with the motion translating mechanism.

8. In a windshield cleaner having, a wiper mechanism, an electric driving motor and transmission mechanism therefor, the combination of, means for controlling the operation of said motor comprising, a contact carrier supporting a pair of normally engaging contact blades, a contact actuator carried by said transmission mechanism, said contact carrier being movably supported in coacting relation with said transmission mechanism, so as to be optionally engageable with the contact actuator, for controlling the circuit through said contact blades.

In testimony whereof I hereto affix my signature.

FREDERICK J. HARDMAN.